United States Patent Office 3,545,257
Patented Dec. 8, 1970

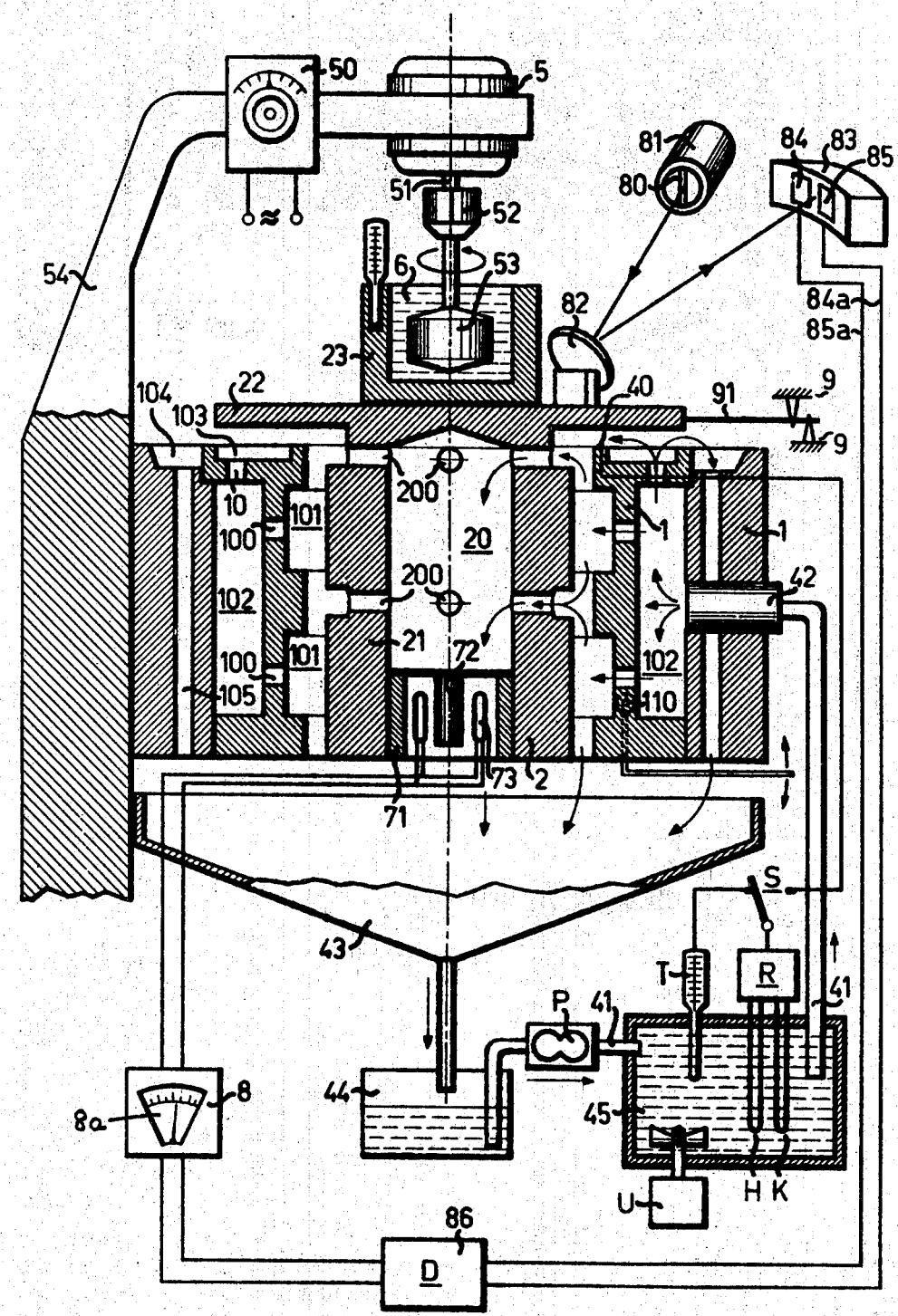

3,545,257
VISCOSIMETER
Georg Zemp, Zurich, and Robin Zangger, Opfikon, Switzerland, assignors to Contraves AG, Zurich, Switzerland, a corporation of Switzerland
Filed Mar. 13, 1969, Ser. No. 806,811
Claims priority, application Switzerland, Mar. 20, 1968, 4,166/68
Int. Cl. G01n 11/14
U.S. Cl. 73—59                                    7 Claims

ABSTRACT OF THE DISCLOSURE

A viscosimeter incorporates a measuring body member rotatably driven by a drive motor, the measuring body member exerting a moment of rotation via the substance to be measured upon a measuring container which is secured to a support arrangement mounted for substantially frictionless rotation. The exerted moment of rotation is compensated by means of a counter-moment of rotation generated by a compensation or balancing mechanism. The measurable physical magnitude required for generating the counter-rotational moment provides a measure for the viscosity of the substance to be analyzed or measured.

BACKGROUND OF THE INVENTION

The present invention relates to an improved viscosimeter for measuring the viscosity of fluids or the like.

The viscosity of fluids, whereby under the term "fluids" as used herein there should be understood, for instance, also sand or similar or other flowable materials, can be, for instance, measured in the following manner: There is undertaken a measurement of the moment experienced by a measuring body member rotating with constant velocity and immersed in the substance to be analyzed or measured, or there is measured the moment transmitted by such measuring body member to a measuring container. This moment provides a measure or indication of the viscosity of the substance to be analyzed or measured.

Prior art viscosimeters of this type enable the measurement of viscosities of fluids in the range of approximately $10^{-1}$ to $10^5$ poise. However, these conventional viscosimeters are not suitable for determining the viscosity of substances which have a low viscosity and must be measured at low shear rates, because they are not sensitive enough. For many, especially biological organic substances, a determination of the viscosity is only possible at low shear stresses which, notwithstanding partially small viscosity values only permits low rotational speeds of the measuring body member. The rotational moments of, for instance, $10^{-2}$ dynes-cm. which are to be determined during such tests are in the order of $10^5$ times smaller than nowadays usual with viscosimeters of this type construction.

SUMMARY OF THE INVENTION

Accordingly, it is a primary object of the present invention to provide an improved viscosimeter which effectively overcomes the aforementioned drawbacks of the prior art constructions.

Another, more specific objective of the present invention relates to an improved viscosimeter which is relatively simple in construction, reasonably economical to manufacture, and sensitive enough to accurately measure the viscosity of a wide range of substances, even those possessing relatively low viscosity values.

Still a further significant object of the present invention relates to an improved viscosimeter which is sensitive enough to measure rotational moments in the order of magnitude of $10^{-2}$ dynes-cm.

Now, in order to implement these and still further objects of the present invention, which will become more readily apparent as the description proceeds, the exemplary embodiment of invented viscosimeter incorporates a measuring body member which is rotatably driven by a drive motor and which transmits a rotational moment via the substance to be measured to a measuring container or vessel. This measuring container or vessel is secured to a support means or arrangement mounted for substantially frictionless rotation. The rotational moment can be balanced or compensated by a counter-rotational moment produced by a balancing or compensating mechanism. The measurable physical magnitude required for generating the counter-rotational moment provides an indication or measure for the viscosity of the substance to be analyzed or measured.

The proposed solution provided for by the teachings of the invention enables the measurement of rotational moments in the order of magnitude of $10^{-2}$ dynes-cm. Measurement proceeds in accordance with a null-technique. The null-position of the measuring container or vessel mounted for frictionless rotation can be adjusted and controlled by any optional angle measuring system, for instance an inductive, capacitive or optical angle measuring system. It has been found that an optical system is particularly suitable. The frictionless rotational mounting of the measuring container can be achieved, for instance, by means of a hydrostatic slide bearing arrangement designed to take up axial and radial forces. The frictionless rotatably mounted support means or arrangement is formed by a rotational body member embodying a shaft and a plate member. One notable advantage afforded by this solution is the possibility of using the pumped fluid medium, typically oil, of the hydrostatic slide bearing for temperature control. Moreover, in order to obtain the counter-rotational moment required for the null-setting there can be employed, for instance, an electromagnetic moving or rotating coil system.

BRIEF DESCRIPTION OF THE DRAWING

The invention will be better understood, and objects other than those set forth above, will become apparent, when consideration is given to the following detailed description thereof. Such description makes reference to the annexed drawing wherein the single figure illustrates in sectional view an exemplary embodiment of inventive viscosimeter.

DESCRIPTION OF THE PREFERRED EMBODIMENT

Describing now the drawing, in the single figure there is disclosed a hydrostatic slide bearing means which is essentially formed of a rotationally symmetrical bearing bushing or sleeve 1 and the rotational body member 2. This rotational body member 2 is composed of the hollow cylindrical support shaft member 21 serving to take up radial forces and provided with the axial bore 20 and the radial bores 200, as well as a support plate member 22 for absorbing or taking up the axial forces. A concentrically arranged measuring container or vessel 23 is rigidly connected with the plate member 22. The bearing bushing or sleeve 1, which for reasons of manufacture is constructed of a number of components, contains the pocket-shaped grooves 101, 102, 103 and 104 which communicate with one another by means of the radial bores 100 and the axial bores 10. Further, this bearing sleeve or bushing 1 is additionally provided with the axial return-flow bores 105.

There is also provided a circulating pump system for the hydrostatic slide bearing means or arrangement which embodies a pump P, pressure conduits or lines 41, a pressure connection piece 42 leading to the peripheral groove 102, a collecting device 43 and the container 44. The direction of flow of pressurized medium, namely oil in the oil system is represented by the depicted arrows. At the closed cycle pump system, there can also be provided means, such as a thermostat 45 for temperature regulation, cooling means K, heating means H and circulating means U. The control of such thermostat 45 preferably takes place by means of a temperature feeler 40 located directly adjacent the plate member 22 equipped with the measuring container or vessel 23, which plate member is to be thermostatically controlled. A suitable control device or regulator R can be operatively connected via the switch S selectively with the regulating thermometer T or the temperature feeler 40. Furthermore the thermostat 45 could be also arranged at the inlet side of the pump P or the container 44 can be equipped with the means 45 serving for temperature control or regulation.

A suitable drive motor 5 fixedly mounted in a stand or support 54 can be operably associated with conventional regulating means 50 for selecting the rotational speed of the measuring body member 53. This measuring body member 53 is connected via a suitable coupling 52 with the power-takeoff shaft 51 of the drive motor 5 and is exchangeably arranged concentric with the measuring container 23 at the axis of rotation of the hydrostatic bearing. The angle of rotation of the rotational body member 2 can be limited by appropriate stop or limit devices 9 and 91. In the illustrated embodiment such comprises a member 91 which can abut against the limit stops 9.

A magnetic contact or flux ring member 71 and the magnetic ring core 72 of a direct-current rotary coil system are arranged in the bore 20 of the shaft member 21 of the hydrostatic bearing. The magnetic coils 73, which are rigidly connected with the bearing sleeve 1, extend into the space between the magnetic flux ring 71 and the magnetic ring core 72 and are coupled with a metered supply source 8 for direct-current.

Hydrostatic bearings exhibit the characteristic that due to the flow of the pumped oil certain turbulent effects occur which, in turn, bring about an inherent or self-motivated rotation of the rotational body member 2. This inherent rotation can be, for instance, at least coarsely compensated with the aid of a suitable nozzle member 110 which can direct an oil stream or jet. The fine adjustment or compensation of this inherent rotation can be undertaken prior to each measurement operation with the aid of the rotary coil system embodying the components 71, 72, 73, and 8 previously considered. The zero or null-position of the rotational body member 2 is determined by means of an optical angle measuring system consisting of the lamp 81 provided with the slit diaphragm or apertured stop 80, the mirror 82 mounted upon the rotatable plate member 22 and the measuring scale device 83. It is contemplated that the null-position of the rotational body member 2 is automatically adjusted with the aid of the photoelectric cells 84 and 85 which deliver appropriate signals 84a and 85a, respectively, to the control system 86 incorporating a conventional differential amplifier D.

Now, if the measuring body member 53 begins to rotate in the substance 6 which is to be analyzed or measured, then a rotational moment or torque is transmitted to the measuring container 23 and therefore to the rotational body member 2, this rotational moment representing a measure for the viscosity of the substance 6. The rotational moment can be balanced or compensated with the aid of the rotary coil system 71, 72, 73, 8 and the optical angle measuring system 80, 81, 82, 83. The change in current in the coils 73 of the aforementioned rotary coil system required for the null-setting is thus a direct measure or indication for the rotational moment and, therefore, also for the viscosity of the substance. In so doing, an indicating system 8a can be provided which indicates the current difference between the setting when the measuring body member 53 is stationary and rotating, respectively.

It should be apparent from the foregoing detailed description that the objects set forth at the outset to this specification have been successfully achieved. Accordingly,

What is claimed is:

1. A viscosimeter comprising a measuring container for the substance to be measured, a rotatably driven measuring body member immersible in the substance contained in the measuring container, drive means for rotating said measuring body member, support means upon which is secured said measuring container, means for mounting said support means for substantially frictionless rotational movement, said measuring body member during rotation exerting via the substance to be measured a rotational moment upon said measuring container, compensating means for producing a counter-rotational moment which balances said rotation moment exerted upon said measuring container, said compensating means producing a measurable physical magnitude required for generating the counter-rotational moment and which provides a measure for the viscosity of the substance to be measured, said mounting means for said support means comprising hydrostatic bearing means.

2. A viscosimeter as defined in claim 1, further including an angle measuring system for controlling the null-setting of said support means.

3. A viscosimeter as defined in claim 2, wherein said angle measuring system is composed of an optical angle measuring system.

4. A viscosimeter as defined in claim 2, wherein said angle measuring system incorporates means for producing error signals which indicate the direction and amount of deviation of the position of the support means from said null-setting, and wherein such error signals bring about a change of the counter-rotational moment such that the support means is controlled back into the null-position.

5. A viscosimeter as defined in claim 1, further including a closed pumping circuit means for said hydrostatic bearing means, means provided at said pumping circuit means for temperature control of the pumped fluid medium, and wherein said pumped fluid medium also serves for temperature control of said substance to be measured.

6. A viscosimeter as defined in claim 1, wherein said pump fluid medium is oil.

7. A viscosimeter as defined in claim 1, wherein said compensating means for producing the counter-rotational moment comprises an electromagnetic rotary coil system.

References Cited

UNITED STATES PATENTS

| 2,142,854 | 1/1939 | La Pierre | 73—59 |
| 2,643,543 | 6/1953 | Herzog | 73—59 |
| 3,349,606 | 10/1967 | Merrill et al. | 73—60 |

FOREIGN PATENTS

| 199,496 | 9/1967 | U.S.S.R. | 73—60 |
| 684,935 | 12/1952 | Great Britain | 73—59 |
| 1,025,743 | 4/1966 | Great Britain | 73—60 |

LOUIS R. PRINCE, Primary Examiner

J. W. ROSKOS, Assistant Examiner